Feb. 2, 1954  R. C. BAKER  2,667,931
CASING SCRAPER
Filed Aug. 1, 1949  2 Sheets-Sheet 1
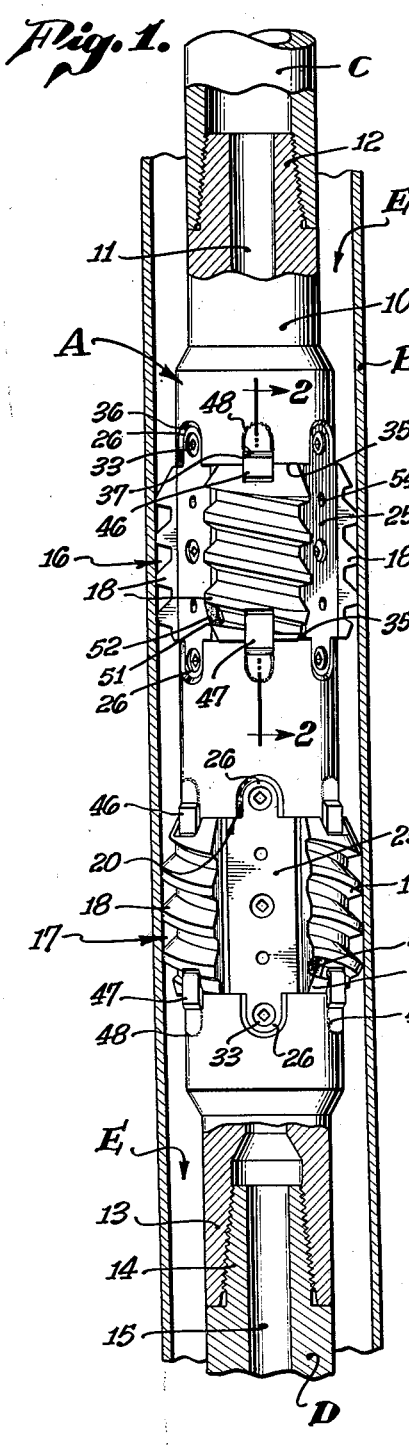
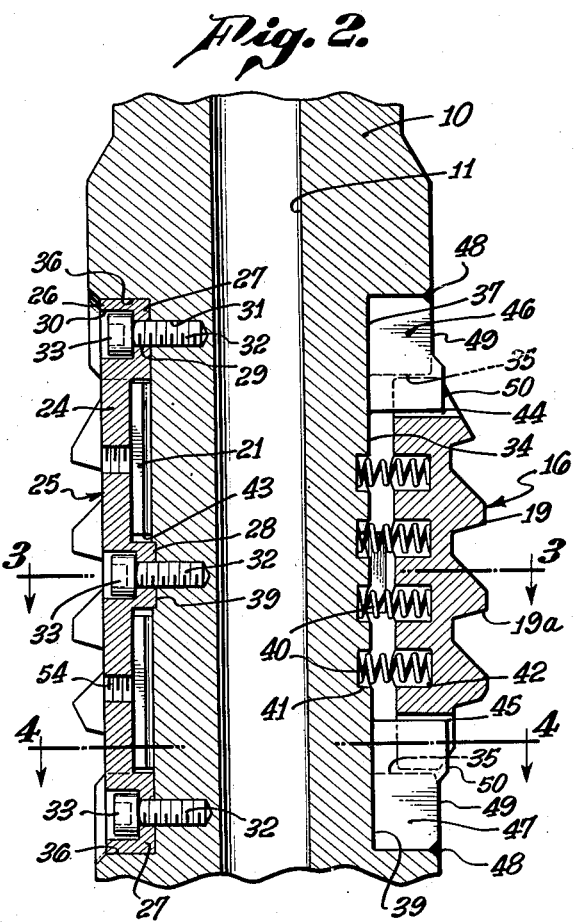
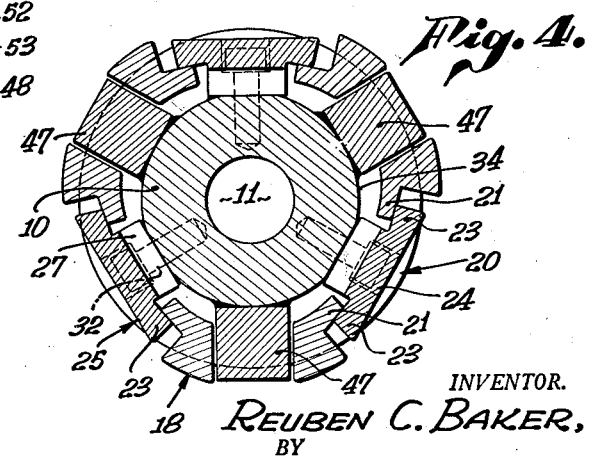
INVENTOR.
REUBEN C. BAKER,
BY
Mellin and Hanscom
ATTORNEYS Feb. 2, 1954 R. C. BAKER 2,667,931
CASING SCRAPER
Filed Aug. 1, 1949 2 Sheets-Sheet 2
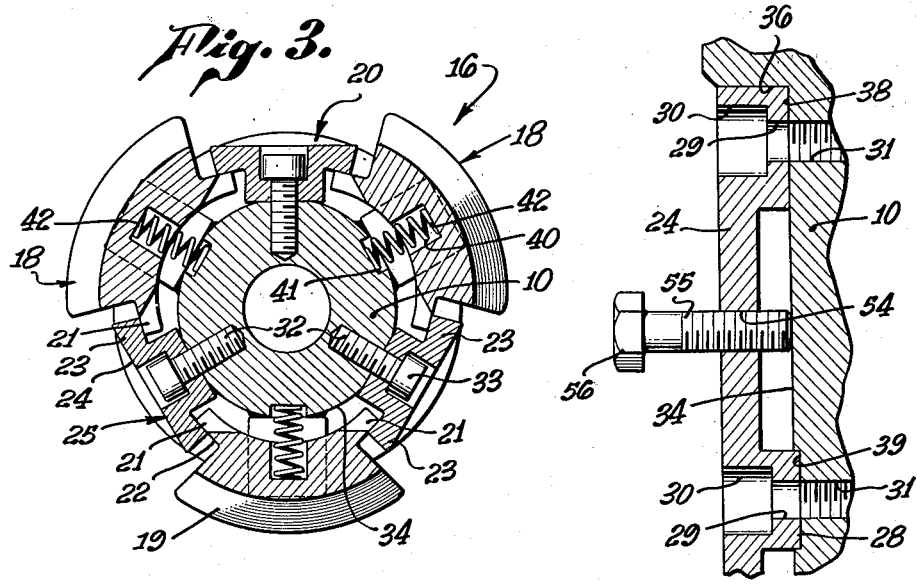
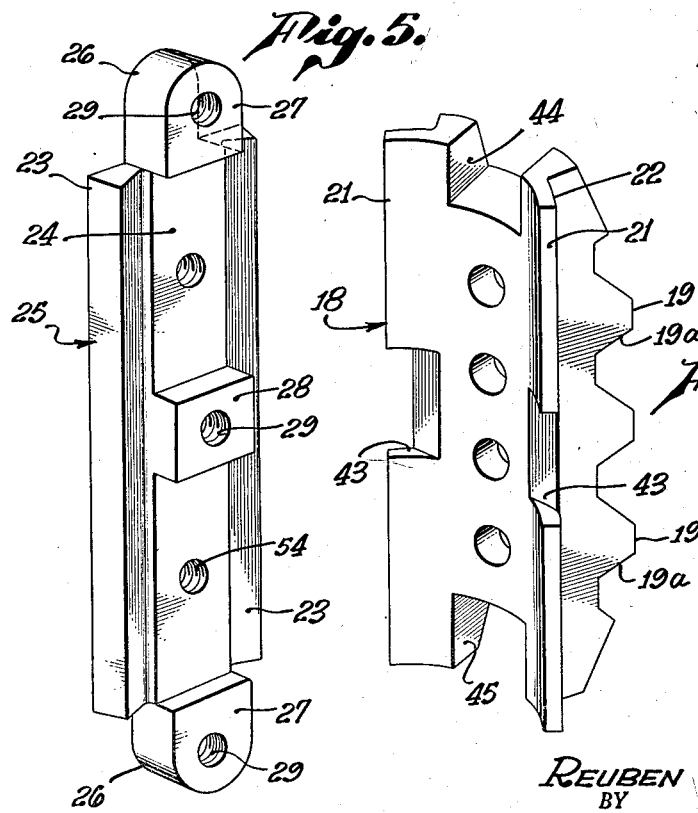
INVENTOR.
REUBEN C. BAKER,
BY
Mellin and Hanscom
ATTORNEYS Patented Feb. 2, 1954

2,667,931

UNITED STATES PATENT OFFICE 2,667,931

CASING SCRAPER

Reuben C. Baker, Coalinga, Calif., assignor to Baker Oil Tools, Inc., Vernon, Calif., a corporation of California Application August 1, 1949, Serial No. 107,961

22 Claims. (Cl. 166—18)

The present invention relates to devices for cleaning the inner walls of well casings, liners, and similar conduits, and more particularly to casing scrapers capable of removing a film or cake of hardened cement, synthetic resin, mud and paraffin, as well as gunshot burrs and bullets, and various other types of undesired materials, from the walls of such conduits.

An object of the invention is generally to improve devices for scraping the walls of well conduits.

Another object of the invention is to provide a casing scraper capable of longitudinal movement to effectively scrape the walls of a well conduit around its entire circumference, and capable of readily removing gunshot burrs, bullets and the like from the well conduit. The casing scraper can perform the above operations by a rotary motion, as well as by longitudinal movement.

Another object of the invention is to provide a casing scraper capable of longitudinal movement to shear cleanly gunshot burrs, bullets and other undesired elements from the wall of the well conduit without any substantial tendency for such elements to reactively rotate the casing scraper.

A further object of the invention is to provide a casing scraper of strong, sturdy and durable construction, which can be manufactured in a relatively economical manner, and which can be easily assembled and dismantled.

Yet another object of the invention is to provide an improved manner of retaining outwardly expansible casing scraper blades in proper assembled position on the main scraper body.

Still a further object of the invention is to provide an improved manner of drivably connecting the casing scraper blades to the main scraper body, the connection being such as to assure proper lateral guiding of the blades relative to the body during inward and outward movement of the blades, in order that the blades will conform to the wall of the well conduit in which it is operated.

Yet a further object of the invention is to make it impossible to assemble scraper blades in a casing scraper in an inverted or other erroneous position.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Fig. 1 is a longitudinal elevation of a casing scraper disposed in a well casing, parts of the tool being shown in section;

Fig. 2 is an enlarged partial longitudinal section taken along the line 2—2 on Fig. 1;

Fig. 3 is a cross section taken generally along the line 3—3 on Fig. 2;

Fig. 4 is a cross section taken generally along the line 4—4 on Fig. 2;

Fig. 5 is an isometric view of one of the blade retainer or stop members, as seen from the rear thereof;

Fig. 6 is an isometric view of one of the scraper blades, as seen from the rear thereof;

Fig. 7 is a partial longitudinal section, on an enlarged scale, illustrating the manner of forcibly releasing a blade retainer segment from the main body of the tool.

The casing scraper A illustrated in the drawings is adapted for operation upon the inner wall of a well casing, liner, or similar conduit B, through which it is movable. The main body 10 of the scraper is a generally elongate, tubular member provided with a central fluid passage 11. A threaded pin 12 is formed at the upper end of the body for threaded attachment to the lower end of a string of drill pipe C running to the top of the well bore, by means of which the tool is moved in the well casing B, both longitudinally and rotationally. The lower end of the body may be formed as a threaded box 13 adapted to be threadedly attached to the upper pin 14 of the main body of a lower drill bit D. This latter member D need not be used, unless it is desired to drill out a substantial obstruction extending transversely across the casing bore. In any event, circulating fluid may be pumped down the drill pipe C and entirely through the fluid passage 11 in the main scraper body 10, flowing down through the lower bit passage 15, from which it exits into the annulus E between the casing B and the equipment A, C, D disposed therein. This circulating fluid flows upwardly through such annulus, to flush the cuttings to the top of the well bore.

The casing scraper has a plurality of sets 16, 17 of scraper blades 18 and cooperating elements that are angularly displaced with respect to each other, so that the cutting surfaces 19 of the blades collectively operate upon the entire circumference of the well casing. In the specific form disclosed in the drawings, two sets of scraper blades 18 and associated elements are disclosed, one set being displaced about 60 degrees with respect to the other set. Inasmuch as each set is shown as including three scraper blades 18, and since each blade has an effective arcuate extent of about 70 degrees, it is apparent that each set of blades will scrape a total of 210 degrees of arc around the circumference of the casing B, and that both sets will scrape about 420 degrees of arc around the casing. Accordingly, it is evident that the blades 18 of one set 16 actually overlap the blades 18 of the other set 17, insofar as scraping action is concerned, giving full assurance that the entire surface of the casing wall will be covered upon longitudinal movement of the tool A in the well casing B.

Since both sets of scrapers and associated elements are alike, although angularly displaced, a detailed description of one set will suffice for both.

In connection with the upper set 16 of blades 18, the main generally cylindrical scraper body 10 is provided with a circumferential groove 20 of substantial elongate extent. The scraper blades 18 are disposed in this groove 20, and are preferably equiangularly displaced from one another. Each blade is provided with axially separated, helical scraper teeth 19, which are inclined to the axis of the tool to a substantial extent. The lower surfaces 19a of these teeth may be suitably hardfaced to enhance their useful life. The inner portion of each blade 18 is provided with oppositely and outwardly extending elongate curved wings 21, which provide steps or shoulders 22. These steps or shoulders are cooperable with companion overlapping wings 23 extending outwardly in opposite directions from the main central body portion 24 of an elongate blade retainer or stop member 25. These stop members 25 are equiangularly displaced from one another within the body groove 20, and are disposed between the blades 18 alternately therewith, as clearly shown in Fig. 3.

The inner wings 21 on the blades will engage the outer wings 23 on the blade retainer members 25, so that outward lateral expansion of the blades 18 is limited. Each retainer member 25 has one wing 23 cooperable with the shoulder 22 on one blade, the opposite wing 23 of the same retainer member being cooperable with the shoulder 22 on the next succeeding blade around the circumference of the tool.

The segments or stop members 25 are firmly secured to the main body 10 of the tool, to form a rigid abutment for the blades 18. As shown in the drawings, each segment is provided with upper and lower end ears 26, from which upper and lower lugs 27 extend in an inward direction. An intermediate lug 28 also extends inwardly from the main body 24 of the retainer, preferably to a slightly greater extent than the end lugs 27, for a reason to be described hereinafter. The ears 26 and lugs 27, 28 are provided with holes 29, each of which has an outer counterbore 30, these holes being in alignment with threaded holes 31 formed in the main scraper body 10. Fastening elements 32, such as screws, are inserted through the holes 29 for threaded reception in the body bores 31, the heads 33 of the screws being received within the counterbores 30.

The circumferential groove 20 formed in the body 10 can be turned readily in a lathe, so that the base 34 of the groove is cylindrical in shape.

At the upper and lower sides 35 of the circumferential groove 20, and in the same radial central planes as the blades 18 and retainer members 25, the body 10 is provided with recesses 36, 37, that may be formed with a milling cutter. The end ears 26 of each blade retainer segment 25 extend into an upper recess 36 and a lower recess 36, the upper and lower lugs 27 fitting snugly against the flat bases 38 of these recesses. However, since the base 34 of the groove 20 is cylindrical, the flat inner surface of the intermediate lug 28 could not have a surface bearing on the groove base. Accordingly, a flat seat 39 is formed in the groove base 34. This seat 39 is disposed inwardly to a greater extent than the remainder of the base 34. For this reason, each intermediate lug 28 extends inwardly to a slightly greater extent than the end lugs 27, in order to have flat bearing engagement against the flattened seat 39.

Each blade 18 is urged outwardly of the scraper body 10 by a plurality of flexible members in the form of compression springs 40, whose inner ends are received within sockets 41 provided in the base 34 of the groove 20, and whose outer ends are received within companion sockets 42 formed centrally along each scraper blade 18. It is evident that the springs 40 bear against the scraper body 10 and against the scraper blades 18, urging the latter outwardly to the extent limited by engagement of the blade wings 21 with the overlapping or overhanging wings 23 of the retainer segments 25. To avoid interference between each scraper blade 18 and the intermediate lugs 28 on the retainer members 25, during inward and outward movement of the blades, the wings 21 on the blades may be provided with notches 43 of sufficient extent as to clear the intermediate lugs.

As was noted above, the upper and lower sets 16, 17 of blades 18 and cooperable elements 25, 40, etc., are identical, although angularly displaced from one another. Since the scraping elements or teeth 19 on the blades collectively cover the entire circumference of the casing wall, the casing B can be scraped effectively merely by moving the tool longitudinally in the well casing. The springs 40 urge the blades 18 outwardly with substantial force against the wall of the casing B, assuring removal of any undesired substance from the well casing.

The blades 18 preferably make a sliding fit with the end walls 35 of the groove 20, so that any longitudinal thrusts are transmitted directly between the scraper body 10 and the blades 18. In the event the tool is rotated to accomplish a scraping action of the casing wall, the blade retainer members 25 will drive the blades in a rotary direction. However, it is preferred to furnish another driving arrangement, which also serves to guide each blade 18 in its lateral movement inwardly and outwardly of the casing body 10.

This last-mentioned objective is accomplished by providing upper and lower notches or grooves 44, 45 in the ends of each blade, preferably in a central plane. Companion recesses 37 are also formed in the upper and lower portion of the body at each end of the body groove 20. These recesses 37 may also be formed by a milling operation, that may be identical, if desired, to the recesses 36 in which the retainer ears 26 and lugs 27 are disposed. Upper and lower driving blocks or members 46, 47 are fitted within the recesses 36, and are secured to the body 10, as by use of welding material 48. The upper and lower driving blocks 46, 47 for each blade extend toward each other and fit within the end notches 44, 45 in the blade 18. The fit is preferably a sliding one with the walls of the notches 44, 45, so as to guide each blade in its movement inwardly and outwardly of the main body 10. The outer portions 49 of each driving member 46, 47 are preferably flush with the periphery of the body 10, whereas, the inner portions 50 may be enlarged transversely, to provide a greater surface of contact between such enlarged portion 50 and the walls of the notches 44, 45.

In the event it is desired to remove materials from the casing wall by a rotary operation, the drill pipe C and main body 10 are rotated, this rotary movement being transmitted directly to the blades 18 through the driving blocks or members 46, 47. The inclination of the blade teeth 19 insures full coverage of the inner surface of the casing wall B.

For the purpose of facilitating insertion of the tool A in a well casing, or other well conduit, the end space 51 between the lowermost tooth on each blade and the main portion of the blade itself may be filled in, as by welding with hardfacing material 52. This hardfacing 52 is inclined in a downward direction, conforming with the inclined lower portion 53 on each blade. As a result, the tool can be inserted in the well casing without danger to the cutter teeth 19 catching or hanging up on the upper end of the well casing, inasmuch as such tapered surfaces 53, 52 will engage the end of the casing and force the blades inwardly against the action of the cooperable springs 40. In addition to acting as a guide for insuring easy insertion of the tool in the well casing, the hardfaced fillings 52 are also effective in operating upon the cement sheath, gunshot burrs, or bullets that might be encountered during rotation of the tool.

For the purpose of facilitating removal of the blade retainers 25, they are each provided with threaded holes 54 between the intermediate and end lugs 28, 27. After the screws 32 have been removed, if the blade retainer 25 can not be dismantled from the body 10 easily, headed screws 55 may be threaded into the retainer holes 54. A suitable wrench, or other tool, can be applied on the screw heads 56 to force the inner ends of the screws 55 against the base 34 of the circumferential groove 20, and reactively shift each retainer member 25 in an outward direction, until it is fully removed from the body 10.

It is to be noted that the cutter edges 19 are inclined at but a small angle to the vertical or axis of the tool. The preferred angle is similar to that employed for the cutter blades in reciprocating shearing presses, in which longitudinal movement of the blade shears across the metallic, or other, object to be severed. In a like manner, downward movement of the present scraper causes its inclined cutting edges to slice across a gunshot burr or bullet, effectively severing it from the casing B.

The small angle of inclination of the cutting edges 19 possesses still a further advantage. When the edge 19 encounters a bullet or burr in the casing wall, during longitudinal movement of the tool in the casing B, the reactive component of force tending to turn the tool A is relatively small, thus avoiding binding of the tool pin 12 in the drill pipe C, or possible unscrewing of the tool from the drill pipe.

Depending upon the size of the casing scraper, it has been found that the angle of the blade to the horizontal, or to a plane at right angle to the tool axis, should be between 5° and 25°, and preferably between 9° and 16°.

Since the hardfaced scraper edges 19a are directed downwardly, provision is made to forestall assembly of the blades 19 in an inverted position. This is accomplished by making each lower blade notch 45 longer than the upper notch 44, and by making each lower drive block 47 correspondingly longer than the upper drive block 46. Thus, the lower longer block 47 will fit into the lower longer notch 45, but not into the upper notch 44. Because of this fact, attempts at assembling the cutter blade 19 in inverted position will be prevented by inability of the lower block 47 to pass into the upper blade notch 44.

It is preferred to make the lower block 47 longer than the upper block 46, since the lower portion of the blade 18 encounters the casing obstruction first and has the greater portion of the load imposed upon it. The larger block provides a greater contacting surface with the lower end of the blade 18, and is better able to transmit and withstand the greater load or torque.

It is to be noted that the body can be formed in a relatively economical manner, since the circumferential grooves 20 can be turned in a lathe. Thereafter, all of the end recesses 36, 37 may be formed in a milling machine, the recesses 37 for the blade driving blocks 46, 47 of one set of cutters being in alignment with the recesses 36 for the retainer ears 26 of another set of blades and retainers. In addition, the helical cutter teeth 19 may be formed in a screw cutting lathe, with each set of cutters being formed from a single cylindrical blank or rough casting, the formed member then being cut into the number of blade segments 18 required for each set 16, 17.

The inventor claims:

1. In a casing scraper: a main body attachable to a drill string, said body having an external groove therein around its entire circumference, said groove having a base of substantially circular cross-section; circumferentially spaced scraper blades in said groove; means engageable with said blades for urging them laterally outward of said body; and retainer means in said groove between and overlapping said blades for limiting the extent of outward expansion of said blades.

2. In a casing scraper: a main body attachable to a drill string, said body having an external groove therein around its entire circumference, said groove having a base of substantially circular cross-section; circumferentially spaced scraper blades in said groove; means engageable with said blades for urging them laterally outward of said body; retainer means in said groove between and overlapping said blades for limiting the extent of outward expansion of said blades; and means providing a slidable connection between said body and each of said blades.

3. In a casing scraper: a main body attachable to a drill string, said body having an external groove therein around its entire circumference, said groove having a base of substantially circular cross-section, said body also having upper and lower recesses on opposite sides of said groove; circumferentially spaced scraper blades in said groove; means engageable with said blades for urging them laterally outward of said body; and retainer means in said groove between and overlapping said blades for limiting the extent of outward expansion of said blades, said retainer means also being disposed in said recesses.

4. In a casing scraper: a main body attachable to a drill string, said body having an external groove therein around its entire circumference, said groove having a base of substantially circular cross-section, said body also having upper and lower recesses on opposite sides of said groove; circumferentially spaced scraper blades in said groove; means engageable with said blades for urging them laterally outward of said body; retainer means in said groove between and overlapping said blades for limiting the extent of outward expansion of said blades, said retainer means also being disposed in some of said recesses; and means disposed in the other of said recesses and engageable with said blades to provide a slidable connection between said blades and body.

5. In a casing scraper: a main body attachable to a drill string, said body having an external groove therein around its entire circumference, said groove having a base of substantially circular cross-section, the top and bottom sides of said groove being parallel to each other; circumferentially spaced scraper blades in said groove slidably engaging said top and bottom sides; means engageable with said blades for urging said blades laterally outward of said body; and retainer members in said groove between and overlapping said blades for limiting the extent of outward expansion of said blades.

6. In a casing scraper: a main body attachable to a drill string, said body having an external groove therein around its entire circumference; circumferentially spaced scraper blades in said groove, each of said blades having scraping portions and also side wings thereon extending outwardly in opposite directions beyond the scraping portions; means engageable with said blades for urging them laterally outward of said body; and blade retainer members in said groove between said blades, each of said retainer members overlapping the side wings of blades on opposite sides of the retainer member for limiting the extent of outward expansion of said blades.

7. In a casing scraper: a main body attachable to a drill string, said body having an external groove therein around its entire circumference; circumferentially spaced scraper blades in said groove, each of said blades having scraping portions and also side wings thereon extending outwardly in opposite directions beyond the scraping portions; means engageable with said blades for urging them laterally outward of said body; blade retainer members in said groove between said blades, each of said retainer members overlapping the side wings of blades on opposite sides of the retainer member for limiting the extent of outward expansion of said blades; and means providing a laterally slidable connection between said body and each of said blades.

8. In a casing scraper: a main body attachable to a drill string, said body having an external groove therein around its entire circumference; circumferentially spaced scraper blades in said groove, each of said blades having scraping portions and also side wings thereon extending outwardly in opposite directions beyond the scraping portions; means engageable with said blades for urging them laterally outward of said body; blade retainer members in said groove between said blades, each of said retainer members overlapping the side wings of blades on opposite sides of the retainer member for limiting the extent of outward expansion of said blades; each of said blades having upper and lower grooves therein; and driving members secured to said body and slidably received in said blade grooves to guide said blades for movement laterally of the body.

9. In a casing scraper: a main body attachable to a drill string, said body having an external groove therein around its entire circumference, said body also having upper and lower recesses on opposite sides of said groove; circumferentially spaced scraper blades in said grooves, each of said blades having a scraping portion and also side wings thereon extending outwardly in opposite directions beyond the scraping portion, each blade having upper and lower grooves therein; driving members disposed in some of said recesses and slidably received in said blade grooves; means engageable with said blades for urging them laterally outward of said body; and blade retainer members in said body groove between said blades, said retainer members being disposed in the other of said recesses and overlapping the blade side wings for limiting the extent of outward expansion of said blades.

10. In a casing scraper: a main body attachable to a drill string, said body having longitudinally spaced external grooves therein, each groove being disposed around the entire circumference of said body, said body also having upper and lower recesses on opposite sides of each groove; circumferentially spaced scraper blades in said grooves, each blade having a scraping portion and also side wings thereon extending outwardly in opposite directions beyond the scraping portions, each blade having upper and lower grooves therein; driving members disposed in some of the recesses on opposite sides of each groove and slidably received in said blade grooves; means engageable with said blades for urging them laterally outward of said body; blade retainer members in said body grooves between said blades, said retainer members being disposed in the other of said recesses and overlapping the blade side wings for limiting the extent of outward expansion of said blades; the blades and retainer members in one body groove being angularly displaced with respect to the blades and retainer members in the other body groove.

11. A casing scraper as defined in claim 10: wherein the retainers disposed in one body groove are in substantial alignment with the blades disposed in the other body groove.

12. In a casing scraper: a main body member attachable to a drill string, said body member having an external groove therein; a scraper blade member in said groove and having its ends slidable along the opposed side walls of said groove, said blade member having helical scraper teeth thereon; one of said members having an end groove therein; a driving member secured to and extending longitudinally from the other of said members and slidably received in said end groove to guide said blade member for movement laterally of the body member; means engageable with said blade member for urging said blade member laterally outward of said body; and means means for limiting the extent of outward movement of said blade member.

13. In a casing scraper: a main body attachable to a drill string, said body having an external groove therein; a scraper blade in said groove and having its ends slidable along the opposed side walls of said groove, said blade having helical scraper teeth thereon, said blade having upper and lower substantially central end grooves extending inwardly toward each other from the ends of the blade; driving members secured to said body and slidably received in said end grooves to guide said blade for movement laterally of the body; means engageable with said blade for urging said blade laterally outward of said body; and means for limiting the extent of outward movement of said blade.

14. In a casing scraper: a main body attachable to a drill string, said body having an external groove therein; a scraper blade in said groove having helical scraper teeth thereon, said blade having upper and lower substantially central end grooves; driving members secured to said body and slidably received in said end grooves to guide said blade for movement laterally of the body; the end groove and driving member at one end of said blade being longer than the end groove and driving member at the other end of said blade; means engageable with said blade for urging said blade laterally outward of said body; and means for limiting the extent of outward movement of said blade.

15. In a casing scraper: a main body attachable to a drill string, said body having an external groove therein around its entire circumference, said groove having a base of substantially circular cross-section; circumferentially spaced scraper blades in said groove and having their ends slidable along the opposed side walls of said groove; means engageable with said blades for urging them laterally outward of said body; retainer means in said groove between said blades and the side walls of said groove and overlapping said blades for limiting the extent of outward expansion of said blades; and means providing a slidable connection between said body and each of said blades.

16. In a casing scraper: a main body attachable to a drill string, said body having an external groove therein around its entire circumference, said groove having a base of substantially circular cross-section, said body also having upper and lower recesses on opposite sides of the side walls of said groove; circumferentially spaced scraper blades in said groove and having their ends slidable along the opposed side walls of said groove; means engageable with said blades for urging them laterally outward of said body; retainer means in said groove between said blades and the side walls of said groove and overlapping said blade for limiting the extent of outward expansion of said blades, said retainer means also being disposed in some of said recesses; and means disposed in the other of said recesses and engageable with said blades to provide a slidable connection between said blades and body.

17. In a casing scraper: a main body attachable to a drill string, said body having an external groove therein around its entire circumference; circumferentially spaced scraper blades in said groove and having their ends slidable along the opposed side walls of said groove, each of said blades having scraping portions and also side wings extending transversely outwardly in opposite directions beyond the scraping portions; means engageable with said blades for urging them laterally outward of said body; and blade retainer members in said grooves between said blades and the side walls of said groove, each of said retainer members overlapping the side wings of blades on opposite sides of the retainer member for limiting the extent of outward expansion of said blades.

18. In a casing scraper: a main body attachable to a drill string, said body having an external groove therein around its entire circumference; circumferentially spaced scraper blades in said groove and having their ends slidable along the opposed side walls of said groove, each of said blades having scraping portions and also side wings thereon extending transversely outwardly in opposite directions beyond the scraping portions; means engageable with said blades for urging them laterally outward of said body; blade retainer members in said groove between said blades and the side walls of said groove, each of said retainer members overlapping the side wings of blades on opposite sides of the retainer member for limiting the extent of outward expansion of said blades; each of said blades having upper and lower grooves therein extending inwardly toward each other from the ends of each blade; and driving members secured to said body and slidably received in said blade grooves to guide said blades for movement laterally of said body.

19. In a casing scraper: a main body attachable to a drill string; a scraper blade carried by said body and having teeth thereon inclined around the blade periphery to place one end of a tooth higher than its other end; each blade having a peripheral groove adjacent and below the lowermost tooth; a filler within said groove secured to said blade to bridge said groove and tapered downwardly and inwardly toward the axis of the body from the higher end of the lowermost tooth on each blade; means engageable with the blade for urging it laterally outward of said body; and retainer means for limiting the extent of outward expansion of said blade.

20. In a casing scraper: a main body attachable to a drill string, said body having an external groove therein; a scraper blade in said groove having helical scraper teeth thereon and having its ends slidable along the opposed side walls of said groove, said blade having upper and lower substantially central end grooves extending inwardly toward each other from the upper and lower ends of the blade; driving members secured to said body and slidably received in said end grooves to guide said blade for movement laterally of the body; the end groove and driving member at one end of said blade being longer than the end groove and driving member at the other end of said blade; means engageable with said blade for urging said blade laterally outward of said body; and means for limiting the extent of outward movement of said blade.

21. In a casing scraper: a main body member attachable to a drill string, said body member having an external groove therein; a scraper blade member in said groove having helical scraper teeth thereon and having its ends slidable along the opposed side walls of said groove; one of said members having upper and lower end grooves therein; driving members secured to the other of said members and slidably received in said end grooves to guide said blade member for movement laterally of the body member; the end groove and driving member at one side of said external groove being longer than the end groove and driving member at the other side of said external groove; means engageable with said blade member for urging said blade member laterally outward of said body; and means for limiting the extent of outward movement of said blade member.

22. In a casing scraper: a main body member attachable to a drill string, said body member having an external groove therein; a scraper blade member in said groove and having its end slidable along the opposed side walls of said groove; said blade member having helical teeth providing lower scraping edges; one of said members having upper and lower end grooves therein; driving members secured to the other of said members and slidably received in said end grooves to drive said blade member for movement laterally of the body member; the end groove and driving member at one side of said external groove being longer than the end groove and driving member at the other side of said external groove; means engageable with said blade member for urging said blade member laterally outward of said body; and means for limiting the extent of outward movement of said blade member.

REUBEN C. BAKER.

References Cited in the file of this patent

UNITED STATES PATENTS

| Number | Name | Date |
|---|---|---|
| 901,484 | Sandstrom | Oct. 28, 1908 |
| 1,733,512 | Parker | Oct. 29, 1929 |
| 2,146,644 | Nelson | Feb. 7, 1939 |
| 2,210,824 | Walker | Aug. 6, 1940 |
| 2,246,421 | Tate | June 17, 1941 |
| 2,275,939 | Baker | Mar. 10, 1942 |
| 2,464,390 | Hammer | Mar. 15, 1949 |